United States Patent [19]

Haines et al.

[11] Patent Number: 5,251,148
[45] Date of Patent: Oct. 5, 1993

[54] INTEGRATED PROCESS CONTROL VALVE

[75] Inventors: Lawrence A. Haines, Mapleton; Edward A. Messano, Provo; Kenneth L. Beatty, Spanish Fork; Robert E. Gooch, Provo; Alan H. Glenn, Salem; Dennis E. O'Hara, Mapleton, all of Utah

[73] Assignee: Valtek, Inc., Springville, Utah

[21] Appl. No.: 533,166

[22] Filed: Jun. 1, 1990

[51] Int. Cl.⁵ .................................... G05D 11/13
[52] U.S. Cl. .................................... 364/509; 364/510; 364/558; 364/557
[58] Field of Search ............... 364/509, 510, 551, 555, 364/557, 558; 73/23.2, 29.01, 37, 37.5, 168; 251/129.08, 129.01; 222/14, 22, 55; 137/454.1, 456, 457, 487.5, 488; 138/39; 374/147, 148

[56] References Cited

U.S. PATENT DOCUMENTS

| | | | |
|---|---|---|---|
| 3,746,049 | 7/1973 | O'Connor, Jr. | 138/39 |
| 4,121,763 | 10/1978 | Roberge | 374/147 |
| 4,333,389 | 6/1982 | Budzich | 137/596.1 |
| 4,458,839 | 7/1984 | MacDonald | 374/147 |
| 4,580,305 | 4/1986 | Bishop | 364/557 |
| 4,581,707 | 4/1986 | Millar | 364/509 |
| 4,643,350 | 2/1987 | Deschaaf et al. | 374/147 |
| 4,761,999 | 9/1988 | Thompson | 73/168 |
| 4,791,954 | 12/1988 | Hasegawa | 137/487.5 |
| 4,875,623 | 10/1989 | Garris | 364/510 |
| 4,976,144 | 12/1989 | Fitzgerald | 364/558 |
| 5,014,211 | 5/1991 | Turner et al. | 364/502 |
| 5,029,597 | 7/1991 | Leon | 73/168 |
| 5,040,380 | 8/1991 | Gregory | 374/147 |

FOREIGN PATENT DOCUMENTS 1153665 9/1983 Canada .............................. 134/457
1295254 5/1969 Fed. Rep. of Germany .

Primary Examiner—Jack B. Harvey
Assistant Examiner—Ellis B. Ramirez
Attorney, Agent, or Firm—Thorpe, North & Western

[57] ABSTRACT

An integrated process control valve includes a fluid valve body having an inlet for receiving fluid, an outlet for discharging fluid, a fluid flow passage connecting the inlet and outlet, and a controllable throttling element which is moveable to selectively vary the flow rate of fluid through the fluid flow passage. The valve also includes an actuator coupled to the valve body and responsive to control signals for selectively moving the throttling element, a first pressure sensor disposed at the inlet of the valve body for producing a first signal representing the pressure of the fluid at the inlet, a second pressure sensor disposed at the outlet of the valve body for producing a second signal representing the pressure of the fluid at the outlet, a position sensor for producing a position signal indicating the position of the throttling element, and a utilization device for receiving the signals and either producing a display representing the signal values and/or producing control signals for supply to the actuator to cause the actuator to move the throttling element to thereby vary the fluid pressure at the inlet and outlet of the valve body. The control signals include pneumatic signals for developing pressures in the actuator to cause the actuator to move the throttling element. Sensors are provided for detecting the values of the pneumatic signals which may be displayed by the utilization device along with the display of representations of the other signal values, including the position signal values.

38 Claims, 6 Drawing Sheets

INTEGRATED PROCESS CONTROL VALVE

BACKGROUND OF THE INVENTION

This invention relates to a process control valve, automatic or manual, having integrated therewith a plurality of sensors for sensing various physical parameters of the fluid flowing through the valve, and a utilization device for controlling operation of the valve and/or displaying representations of the parameters.

Control valves, used in a variety of environments not only to control the flow of fluids (liquids and gases), but also to regulate pressure and temperature of fluids in fluid processing systems, are a special type of valve having a power positioning actuator which is responsive to externally supplied signals for operating (moving) a throttling or closure mechanism located in the valve body. Typical of such valves are rotary valves (ball, plug, eccentric disk, etc.) and linear valves (globe, gate, etc.). An exemplary globe-type control valve includes a valve body having an internal passage formed therein with an inlet opening, for receiving fluid, an outlet opening, for discharging fluid, and a central opening located in the valve body between the inlet opening and outlet opening and forming a valve seat. A valve stem, with a valve plug located on one end thereof, is disposed to extend into the valve body and is movable to selectively move the plug onto and off from the valve seat to thereby close the central opening and stop the flow of fluid, or unclose the central opening and allow the flow of fluid, respectively. The other end of the valve stem, opposite that on which the plug is located, is coupled to an actuator typically mounted on top of the valve body. The actuator includes a cylinder, and a movable piston disposed in the cylinder and coupled to the other end of the valve stem (or could include a diaphragm for operating the stem). A pressurized source of air is supplied to a positioner oftentimes located at the side of the actuator, and the positioner, in response to control signals, directs pressurized air to the cylinder both above and below the piston, to thereby cause the piston to move to selected positions in the cylinder and thus the plug to move to desired positions in the valve body.

By controlling the position of the plug in the valve body, upstream pressure, downstream pressure and temperature of the fluid flowing through the valve (as well as external variables such as pressure or volume of fluids in tanks connected into the system, pH of fluid in the system, etc.) can be controlled. Typical prior art methods for determining these upstream and downstream pressures and the temperature of the fluid have involved placing sensors in pipes joined both upstream and downstream to the valve. Flow rates through the valve have also been measured in prior art systems by inserting a flow meter into pipes leading to or coming from the valve. (It has also been proposed that flow rates be determined in microprocessor controlled valves by calculating the flow rates from flow characteristics of the valves and flow characteristics of the fluids. See U.S. Pat. No. 4,581,707). This sensed information could then be transmitted to a remotely situated control processor for processing which could, in turn, transmit signals back to the positioner to cause it to supply pressurized air to the cylinder of the actuator in an attempt to move the plug to positions in the valve body which would yield desired fluid flow parameters. Of course, with the sensors being located outside of the valve the, precision of the process being carried out would not be completely accurate.

SUMMARY OF THE INVENTION

It is an object of the invention to provide an integrated process control valve capable of controlling the flow of a fluid through the valve and of monitoring various parameters of the fluid.

It is another object of the invention to provide such a control valve capable of not only controlling the flow of fluid, but also doing it with increased safety.

It is also an object of the invention to provide such a control valve capable of providing substantially immediate diagnostic information regarding the valve, the fluid and the process being controlled.

It is an additional object of the invention to provide a control valve whose use in a process system reduces system installation and maintenance costs.

It is a further object of the invention to provide an integrated process control valve which may be adapted to measure flow rate through the valve without the use of external flow meters.

It is still another object of the invention to provide such a control valve capable of developing visual "signatures" characterizing the internal operation of the valve and the flow of the fluid.

It is a further object of the invention to provide a control valve capable of maintaining certain parameters of the fluid flowing therethrough at predetermined values.

The above and other objects of the invention are realized in an integrated process control valve which includes a valve body having an inlet for receiving fluid, an outlet for discharging fluid, a fluid flow passage connecting the inlet and outlet, and a throttling element which is movable to selectively vary the flow rate of fluid flowing through the passage. An actuator is coupled to the valve body and is responsive to control signals for selectively moving the throttling element. A first pressure sensor is disposed at the inlet of the valve body for producing a first signal representing the pressure of the fluid at the inlet, and a second pressure sensor is disposed at the outlet of the valve body for producing a second signal representing the pressure of the fluid at the outlet. A utilization device receives and processes the first and second signals and develops control signals for application to the actuator to cause the actuator to move the throttling element in a manner dependent upon the values of the first and second signals.

In accordance with one aspect of the invention, the utilization device includes a video display screen for displaying representations of the first and second signals. Such representations include graphic "signatures" showing various measured values of the first and second signals for various positions of the throttling element. These "measured" signatures may be displayed on the display screen along side of predetermined and previously stored "correct" signatures for enabling the user to determine if the valve is operating properly. Also, signatures may be developed and displayed showing various measured parameters of the valve and valve command signals. For example, if pneumatic control signals are used for causing the actuator to move the throttling element, signatures may be developed and displayed of the values of the pneumatic control signals for various positions of the throttling element.

In accordance with another aspect of the invention, a temperature sensor is disposed in the valve body to produce a third signal representing the temperature of the fluid in the fluid flow passage, and a throttling element position sensor is coupled to the throttling element to produce a fourth signal representing the position of the throttling element. These signals are also supplied to the utilization device for display and for processing to develop the control signals which are applied to the actuator.

In accordance with still another aspect of the invention, the first, second, third and fourth signals are processed, along with certain predetermined parameters which characterize the shape, size, etc., of the valve body being employed, to develop a measure of the flow rate of fluid flowing through the fluid flow passage.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
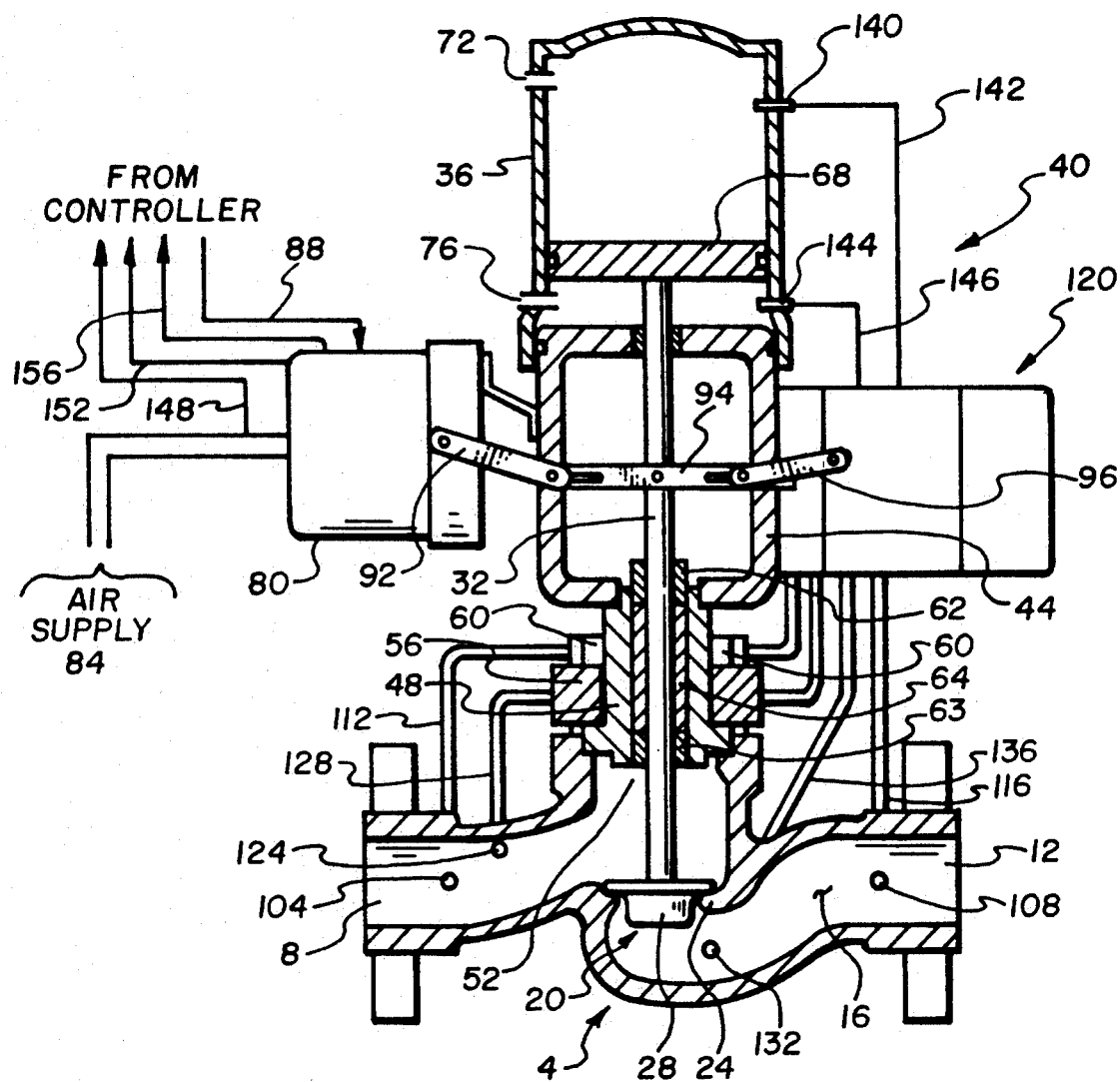
FIG. 1 shows a side, elevational, partially cross-sectional view of a process control valve made in accordance with the principles of the present invention.

Referring to FIG. 1, there is shown one illustrative embodiment of an integrated process control valve made in accordance with the present invention. The valve includes a valve body 4 having an inlet 8, an outlet 12, and a fluid flow passage 16 connecting the inlet and outlet. Formed centrally in the valve body 4 is a central opening 20 circumscribed by a valve seat 24 for receiving a valve plug 28. The valve plug 28 is coupled to the lower end of a valve stem 32 which extends upwardly and out of the valve body 4 to a location within a cylinder 36 which is part of an actuator 40 disposed on the top of the valve body.

The actuator 40 also includes a yoke 44 on which the cylinder 36 is disposed, and which, in turn, is fitted onto a bonnet 48 disposed in an opening 52 in the top of the valve body 4. A bonnet flange 56, and bolts 60, hold the bonnet 48 in place in the opening 52. The stem 32 extends upwardly through the bonnet 48 and is held slidably in place by an upper guide 62 and a lower guide 63, which are surrounded by the bonnet. The valve stem 32 extends also through the yoke 44 and into the cylinder 36 where a piston 68 is disposed on the upper end of the stem.

The cylinder 36 includes openings 72 and 76 for receiving air under pressure into the interior of the cylinder, both above and below the piston 68, to thereby control the positioning of the piston 68 in the cylinder and thus the position of the plug 28. That is, when air supplied to opening 72 is under greater pressure than that supplied to opening 76, the piston 68 is forced downwardly, and vice versa.

Mounted on the side of the yoke 44 is a valve positioner 80 which receives air under pressure from an air supply 84 and, in response to an electrical control signal supplied via line 88 from a controller 120, develops a control pressure by which air under pressure is selectively directed to either the opening 72 or the opening 76 in the cylinder 36.

The positioner 80 includes an arm 92 coupled to a stem clamp 94 which, in turn, is coupled to the stem 32 so that each change of position of the plug 28 and thus of the stem 32 may be detected by the positioner. The position of the stem 32, as detected by the arm 92, is mechanically converted into a force (represented, for example, by distortion of a spring) and then compared to a force representing an input signal from the controller 120 supplied over lead 88, to ascertain the difference in values of the forces. The positioner 80 then causes the piston 68 to move until the signal values match, indicating that the piston, and thus plug 28, has been moved to the correct position. The position of the stem 32, and thus plug 28, is detected by the controller 120 via a position sensor arm 96 pivotally mounted to the controller and coupled to the stem clamp 94. An angular position sensor disposed in the controller 120 detects the angular position of the arm 96 and thus the position of the stem 32. This information is made available to the controller 120.

The above description is generally of a conventional process control valve available, for example, from Valtek of Springville, Utah. There are, of course, other types of process control valves on which the present invention could be used, but the valve described in FIG. 1 serves as a suitable representation of well known parts and operation of a process control valve on which the present invention may be utilized.

Disposed in the valve body 4 are a number of sensors, including a pressure sensor 104 disposed in the side wall of the fluid flow passage 16, near the inlet 8, and at a location where the axial side walls of the passage are generally linear or uncurved. The purpose of this is to locate the sensor 104 at a place in the valve body 4 a repeatable, continuous pressure measurement can be made, unaffected by flow problems. This is best accomplished at an axially linear portion of the passage 16. A second pressure sensor 108 is located at the outlet 12 of the valve body 4, again on the side wall, and at a location where the axis of the fluid flow generates substantially repeatable, continuous pressures. The sensors 104 and 108 are located on the side of the passage 16, rather than at the bottom or at the top, to avoid contamination and interference by debris and scales flowing along the bottom or gas bubbles flowing along the top. The pressure sensors 104 and 108 could be any of a variety of fluid pressure sensors such as a conventional diaphragm strain gauge.

The pressure sensors 104 and 108 produce signals which are carried by lines 112 and 116 respectively to a controller 120 which is mounted on the side of the yoke 44. Advantageously, the pressure signals would comprise voltage levels for supply to the controller 120 for initial storage and ultimate processing. The controller 120 could advantageously be a microprocessor such as the Intel 8032 microcontroller or the Motorola 68332 microprocessor.

Also disposed in the fluid flow passage 16 of the valve body 4 is a temperature sensor 124 for sensing the temperature of the fluid flowing in the passage. The sensor 124 might illustratively be a thermocouple temperature sensor suitable for measuring temperatures over a wide range. The temperature sensor 124 produces a signal which is supplied by line 128 also to the controller 120.

Disposed on the downstream side of the valve seat 24 in the fluid flow passage 16 is a cavitation sensor 32. This sensor develops a signal representing the cavitation or turbulence taking place in the narrowest part of the passage 16 (vena contracta) where such cavitation is of concern. The signal so developed, again, is supplied via line 136 to the controller 120. The cavitation sensor 128 is a conventional sensing device such as accelerometer or an acoustic transducer.

Two air pressure sensors are provided in the cylinder 36 of the actuator 40, including a sensor 140 for sensing the air pressure above the piston 68 and a sensor 144 for sensing the pressure below the piston, both in the cylinder 36. Signals developed by sensors 140 and 144, representing the detected air pressures, are supplied via lines 142 and 144 respectively to the controller 120.

Other parameters which may be sensed and utilized by the controller 120 are the pressure of the air from the air supply 84, (characterizing signal supplied over line 148 to the controller) the position of the piston 68 and thus stem 32 as determined by the arm 92 (characterizing signal supplied over line 152), and a control pressure produced by the positioner 80 in response to the electrical signals supplied over line 88 (characterizing signal supplied by the positioner 80 over line 156).

A number of the parameters sensed for the valve shown in FIG. 1 are specific to the particular valve structure thereshown. It should be understood that a variety of other parameters could likewise be sensed or detected by built-in sensing devices if other valve structures were employed. Signals representing these parameters could also be supplied to the controller 120 as desired by the user.

Figure 2:
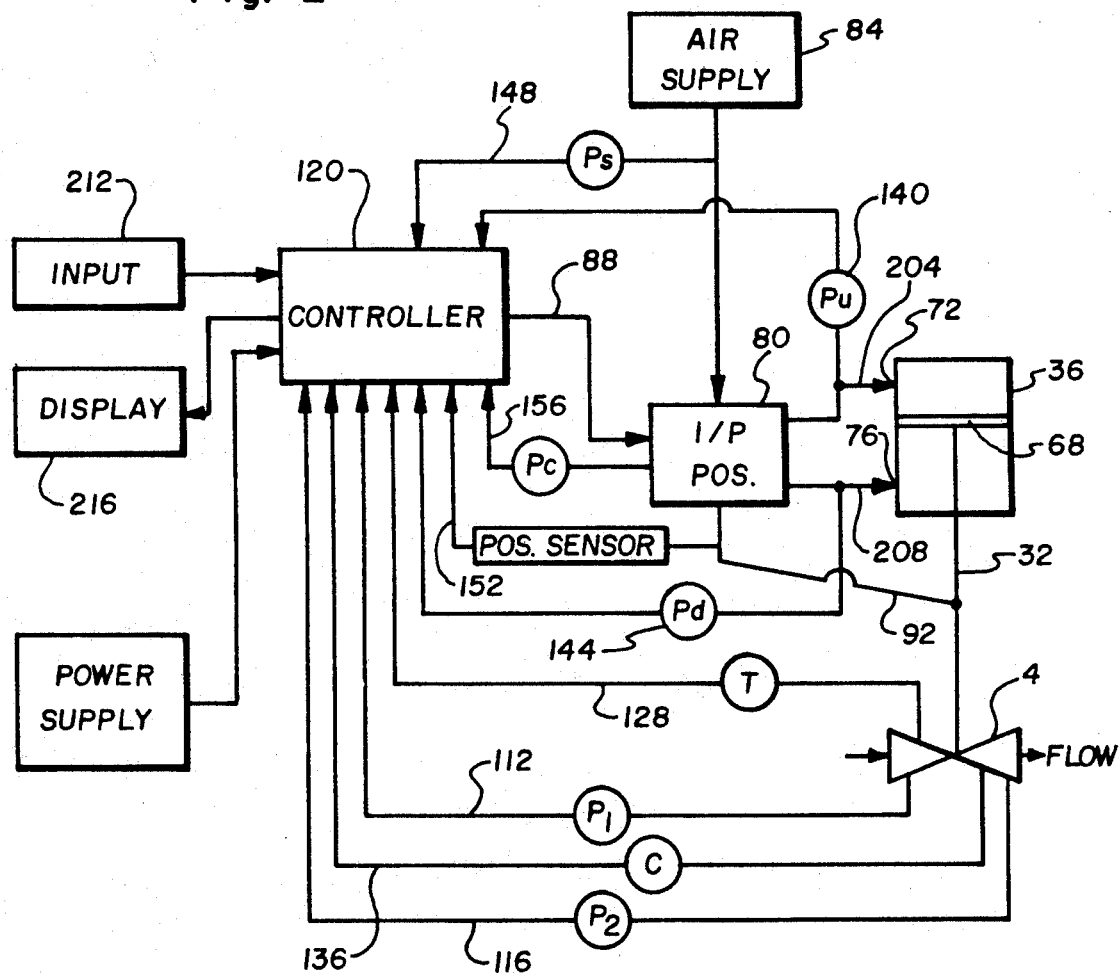
FIG. 2 is a schematic diagram of the process control valve of FIG. 1, illustrating various parameters of the valve and the fluid flowing through the valve which may be sensed for later use or display.

Referring now to FIG. 2, there is shown a schematic diagram of the integrated process control valve of FIG. 1, with the valve body shown at 4 in diagrammatic form, the valve stem being shown at 32, the cylinder of the actuator being shown at 36, the piston being shown at 68, the positioner at 80, and the positioner arm at 92. Other parts of FIG. 2 corresponding to the FIG. 1 apparatus are the controller 120 (but not shown mounted on the side of the yoke as in FIG. 1), a position sensor line 152 for carrying signals to the controller representing the position of the piston 168, a control pressure line 156 for carrying signals representing the control pressure developed by the positioner 80, a control signal line 88 for carrying the electrical control signals from the controller to the positioner, an air supply pressure line 148 for carrying signals representing the pressure of air supplied by the supply 84, valve inlet and outlet pressure lines 112 and 116 respectively for carrying signals representing the fluid pressure at the inlet of the valve body 4 and at the outlet of the valve body, a temperature sensing line 128 for carrying signals representing the temperature of the fluid in the valve body 4, and a cavitation sensing line 136 for carrying signals representing the cavitation occurring in the vena contracta of the valve body 4, all as previously discussed. Finally, the air pressure in the cylinder 36 above the piston 68 is determined by a pressure sensor 140 shown located in an input air pressure line 204 (rather than in the sidewall of the cylinder 36 as in FIG. 1), and the air pressure in the cylinder 36 below the piston 68 is determined by a pressure sensor 144 shown located in an input pressure line 208.

The controller 120 is programmed to read, store and process the signals supplied by the various sensors, as desired by the user, and then may signal the positioner 80 to change the position of the piston 68 and thus the position of the plug 28 (FIG. 1) to bring the valve in conformance with certain predetermined characteristics. For example, predetermined inlet pressures $P_1$, and outlet pressures $P_2$, or a predetermined temperature T could be keyed into the controller 120 on an input device 212 and stored. The controller 120 could then be programmed to successively monitor the inlet and outlet pressures and temperature of the fluid in the valve body 4, and then make adjustments in the position of the piston 68 to bring selected measured parameters into conformance with the corresponding predetermined stored parameters.

The controller 120 may also be programmed to develop a variety of data, graphs and "signatures" which may be displayed on a video display screen 216 for viewing by the user. Further, a signature of the valve can be developed prior to use and this signature stored in the controller 120 for comparison against signatures developed at various times while the valve is in use. For example, a signature consisting of correct pressures, temperature and flow rates for various positions of the plug 28 (and thus various flow capacities $C_v$) can be determined and stored in the controller for subsequent comparison with corresponding measured signatures to determine if the valve is operating and process proceeding correctly.

The internal parameters of the valve such as the air pressure in the cylinder above the piston $P_u$, the air pressure in the cylinder below the piston $P_d$, the control of pressure developed by the positioner $P_c$, the air supply pressure $P_s$ and the position of the piston and valve stem, could also be measured, stored and displayed on a display screen 216 (FIG. 2). Predetermined acceptable ranges for these parameters could also be stored in the controller 120 and then periodically compared with corresponding measured values for the parameters (for example on the display screen 216) to enable the user to determine if the measured parameters are within acceptable ranges.

Figure 3:
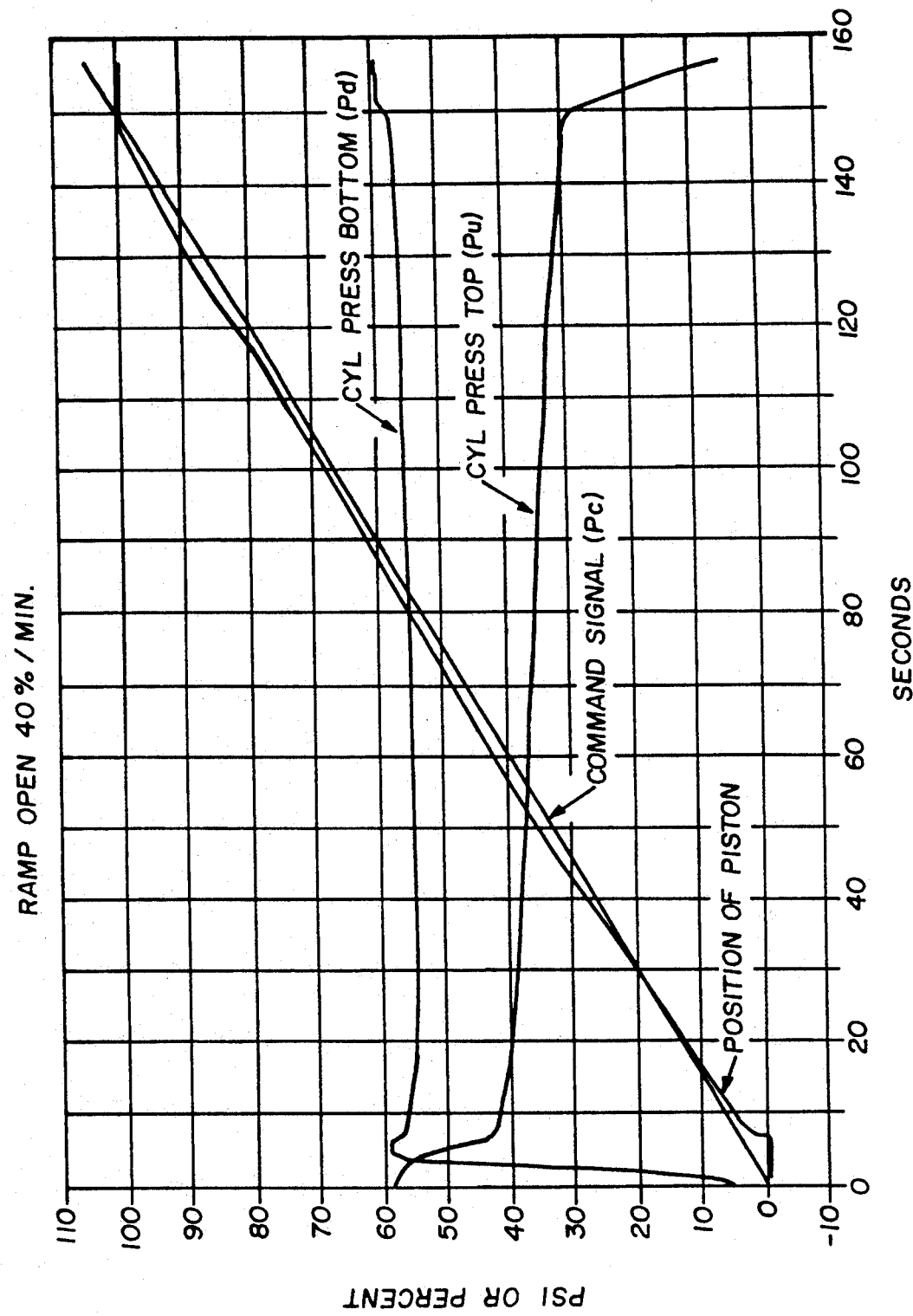
FIGS. 3 and 4 are graphical representations of the values of various parameters of the valve of FIG. 1 as the valve is opened and closed respectively.
Figure 4:
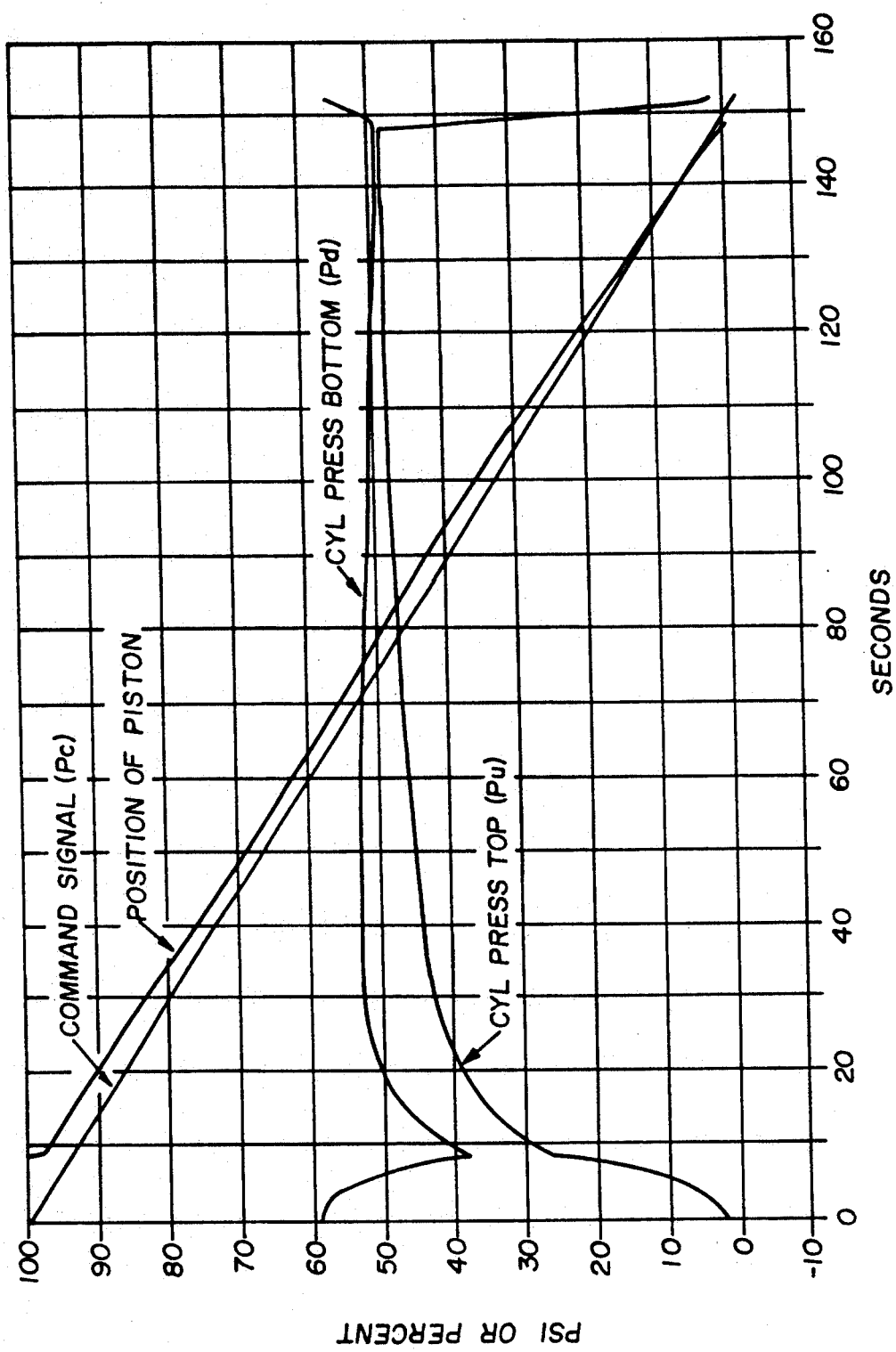

FIGS. 3 and 4 show representative graphs of various parameter measurements of the process control valve of FIG. 1, as the valve is gradually opened (FIG. 3) and as the valve is gradually closed (FIG. 4). Such graphs may be displayed on the display screen 216 (FIG. 2) to show the user how the valve is operating. The various lines on the graphs of FIGS. 3 and 4 are labeled to correspond to the parameter identification given above.

Still other uses could be made of the measured parameters, both of the fluid flowing through the valve and of the internal operation of the valve such as taking and storing the measurements at one point in time and then at a later point in time taking and storing new measurements and comparing these with the previously stored measurements to determine if a significant and possibly defect-indicating change has taken place over the period of time from the taking of the first measurements to the taking of the second measurements. Of course, if a problem is indicated in any of the diagnostic procedures described, corrective action could be immediately implemented.

The integrated process control valve described and shown in FIGS. 1 and 2 could also be used to provide a "signature" of the process and operation taking place in other components of the system in which the valve is installed. For example, pumps, other valves, holding tanks, etc. are typically designed to operate within certain specifications as to pressure, temperature, etc. and pressure and temperature measurements could be made by the valve of the present invention and compared to previously provided specification values for the other components to which the valve is connected to thereby determine if the measured parameters compare with the specification values.

Figure 5:
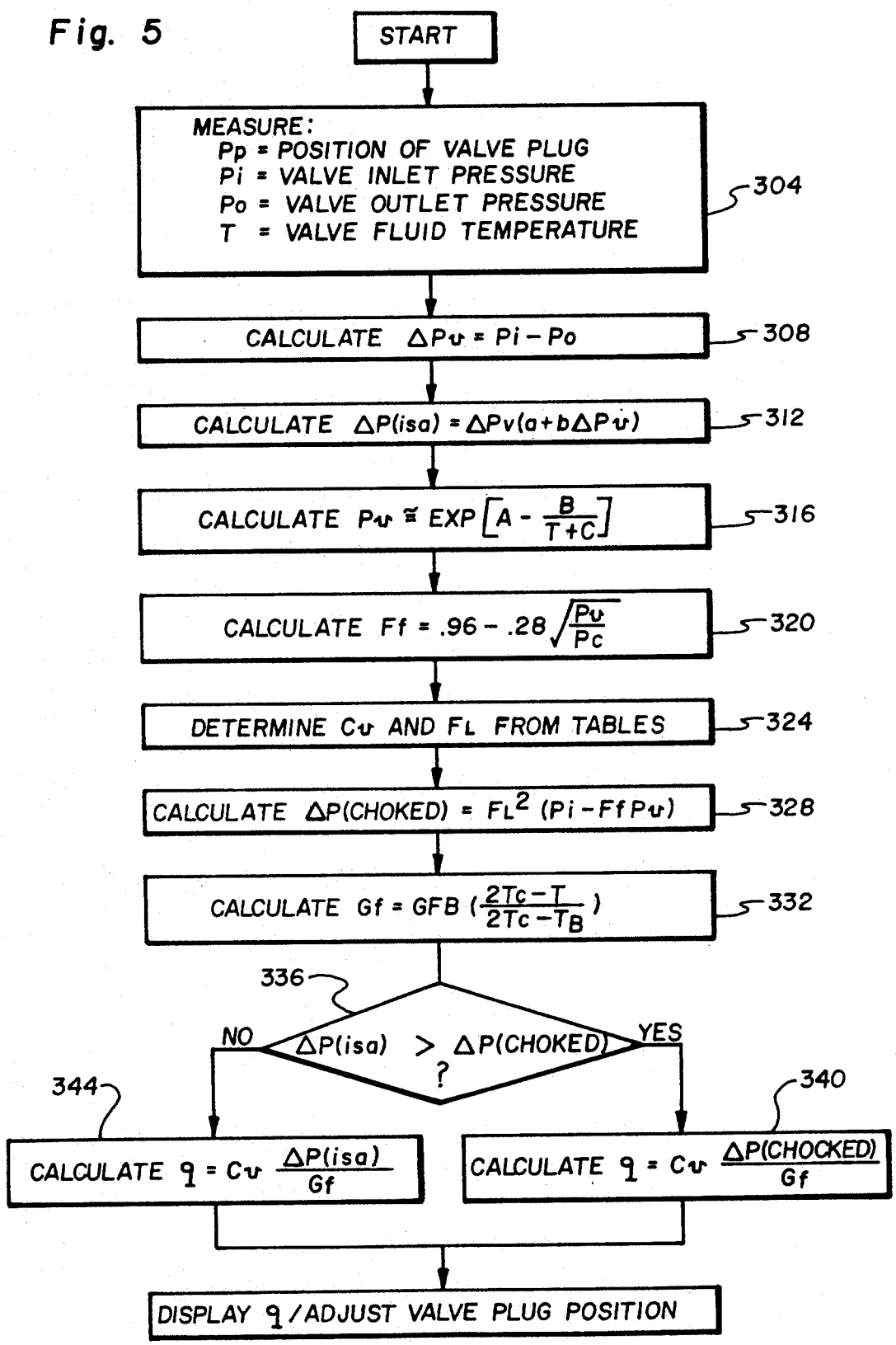
FIG. 5 is a flow diagram suitable for calculating flow rate of a liquid through the valve of FIG. 1.

FIG. 5 shows a flow chart of a program which may be implemented on the controller 120 for calculating the flow rate of liquid in the valve body 4. The first step, after the start, is to measure the position of the valve plug (piston), and the valve inlet pressure, valve outlet pressure, and temperature of the fluid flowing in the valve for given positions of the valve plug (box 304). These measurements are supplied to the valve controller which stores the measurements for subsequent processing. Next, the pressure drop $\Delta P_v$ across the valve body for various valve plug positions is calculated in accordance with the formula of box 308. This pressure drop is corrected for ISA standards since subsequent calculations in arriving at the flow rate are all keyed to these ISA standards. The correction formula is shown in box 312, where a and b are empirically determined constants for various positions of the valve plug for the particular valve in question typically done to compensate for change in pressure readings.

Next, the vapor pressure $P_v$ of the liquid is calculated in accordance with the formula shown in box 316, where A, B and C are Antoines coefficients for the liquid in question. The liquid pressure ratio factor $F_f$ is then calculated in accordance with the formula given in box 320, where $P_c$ is the critical pressure for the particular liquid flowing through the valve. The flow coefficient $C_v$ and liquid pressure recovery coefficient $F_L$ for the valve are determined from predetermined, stored tables for the particular valve and for various positions of the valve plug.

Next, the valve is checked to determine if it is choked (cavitating) and this is done by first calculating the pressure drop across the valve for the choked condition $\Delta P$(choked) in accordance with the formula shown in box 328. The specific gravity $G_f$ of the liquid is next calculated pursuant to the formula in box 332, where GFB, $T_c$ and $T_B$ are known constants for the particular liquid in question. In box 336, a determination is made as to whether or not the pressure drop calculated in box 312 is greater than the pressure drop for a choked valve, calculated in box 328, and if it is, the process moves to box 340, otherwise the process moves to box 344. In both cases, the flow rate q is calculated using formulas shown in the boxes to give the desired current measure of flow rate.

The calculated flow rate may either be used to apprise the user by way of a visual display as to the present flow rate of fluid in the valve, or to provide an indication to the controller as to which direction the valve plug must be moved to change the flow rate and thus bring it closer to a predetermined desired flow rate value. The controller would develop the appropriate signal for supply to the valve positioner to cause the valve positioner to change the position of the valve plug, after which measurements and calculations to obtain the flow rate would again be made. This process would be repeated until the desired flow rate were achieved.

Figure 6:
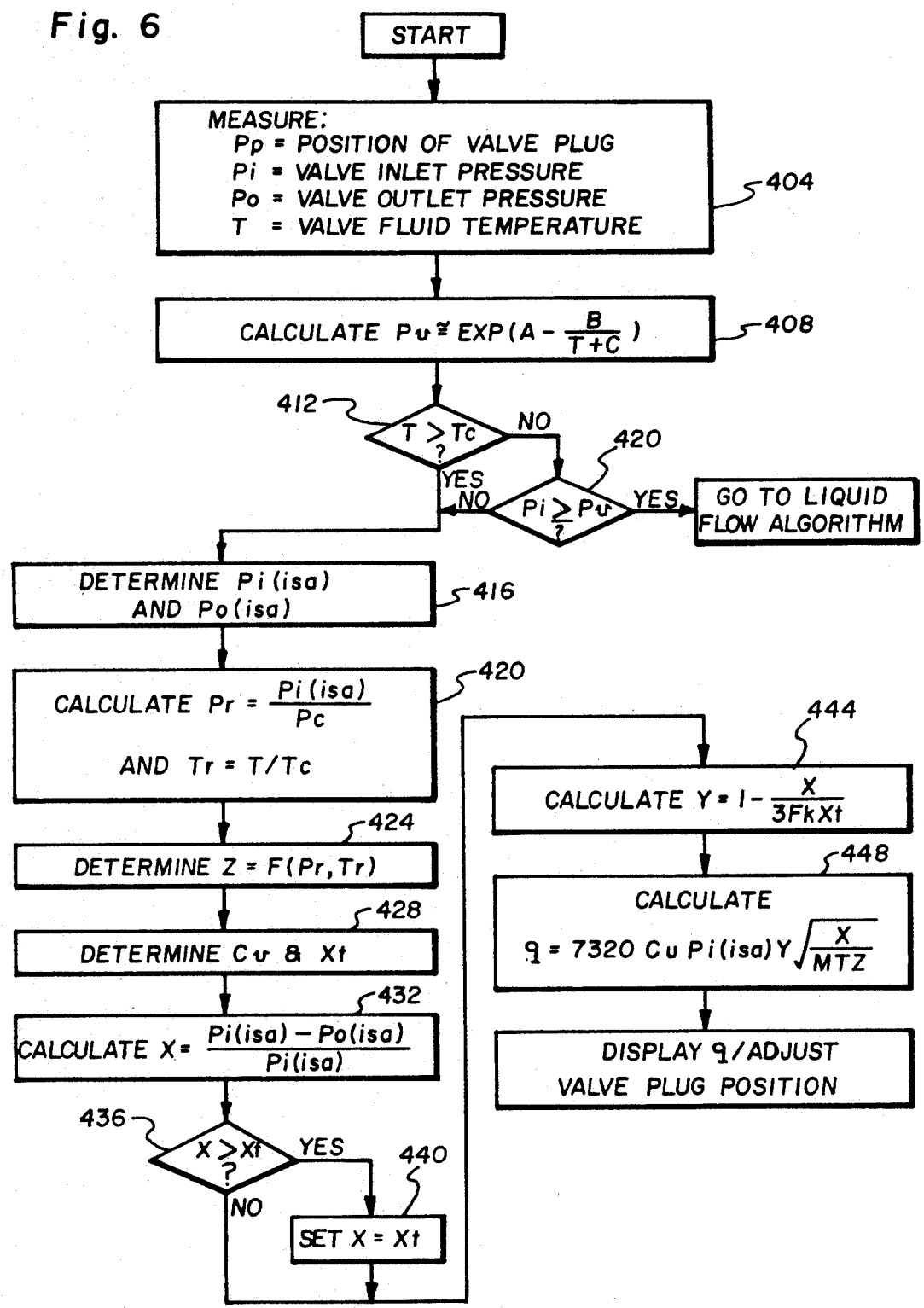
FIG. 6 is a flow diagram suitable for calculating the flow rate of a gas flowing through the valve of FIG. 1.

FIG. 6 shows a flow diagram for calculating flow rate of a gas in the valve of FIGS. 1 and 2. As with liquids, the first step after starting is to measure the position of the valve plug, and the valve inlet pressure, valve outlet pressure and valve fluid temperature as indicated in box 404. The vapor pressure of the gas $P_v$ is then calculated (box 408) using a formula already discussed. A determination is then made as to whether the measured temperature T is greater than the critical absolute temperature $T_c$ (for the particular gas flowing through the valve) as indicated in box 412. If it is, the process moves to box 416; otherwise the process moves to box 420. At box 420, a determination is made as to whether the valve inlet pressure $P_i$ is greater than or equal to the vapor pressure $P_v$ and if it is, the process is stopped since the fluid flowing in the valve may be a liquid rather than a gas.

Assuming that the fluid in the valve is a gas, and that the process moved either from box 412 or box 420 to box 416, the valve inlet pressure calibrated to ISA standards, and the valve outlet pressure, also calibrated to ISA standards, are determined by table lookup which would have been earlier determined by experimental testing and stored in the controller.

The next step in the process is to calculate $P_r$ and $T_r$ (box 420) which, along with stored tables, are used to determine the compressibility factor Z of the gas (box 424), where $P_c$ is the critical pressure (psia) for the gas. In box 428, the flow coefficient $C_v$ and gas pressure recovery coefficient $X_t$ for various valve positions are determined from predetermined, previously stored tables.

The ratio of the pressure drop across the valve to the valve inlet pressure is then calculated in box 432, followed by a determination as to whether X is greater than $X_t$ (box 436). If it is (meaning that a choked condition exists), X is set equal to $X_t$ (box 440), and the process moves to box 444, whereas if it is not, the process moves directly to 444. The expansion factor Y is calculated in accordance with the formula given in box 444, where $F_k$ equals K/1.40 and K is the ratio of specific heats for the gas in question. Finally, the flow rate q is calculated in box 448 as shown by the formula.

Following calculation of the flow rate for gas, the controller may either display the calculated rate, use it to adjust the valve plug position to thereby change the flow rate, or both as previously described for the calculation of liquid flow rates.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A process control valve comprising
    a fluid valve body having an inlet for receiving fluid, an outlet for discharging fluid, a fluid flow passage connecting the inlet and outlet, and a controllable throttling element which is moveable to selectively vary the cross-sectional area of flow of at least a portion of the passage, actuator means coupled to the valve body and responsive to control signals for selectively moving the throttling element, a first pressure sensor disposed at the inlet of the valve body for producing a first signal representing the pressure $P_1$ of the fluid at the inlet, a second pressure sensor disposed at the outlet of the valve body for producing a second signal representing the pressure $P_2$ of the fluid at the outlet, utilization means for receiving said first and second signals and for developing an output dependent upon the received signals, said utilization means including means for determining the fluid pressure drop across the valve body from the first and second signals, means for storing a predetermined fluid pressure drop value, means for comparing the determined fluid pressure drop with the stored fluid pressure drop value and for producing a difference signal whose magnitude represents a difference between the compared values, and means for producing control signals for application to the actuator means to cause it move the throttling element to thereby vary the fluid pressure drop across the valve body to more closely match the stored fluid pressure drop value and reduce the magnitude of the difference signal.

2. A process control valve comprising a fluid valve body having an inlet for receiving fluid, an outlet for discharging fluid, a fluid flow passage connecting the inlet and outlet, and a controllable throttling element which is moveable to selectively vary the cross-sectional area of flow of at least a portion of the passage, actuator means coupled to the valve body and responsive to control signals for selectively moving the throttling element, a temperature sensor for producing a temperature signal representing the temperature $T_1$ of the fluid in the fluid flow passage, and utilization means for receiving said temperature signal for developing an output dependent upon the received temperature signal and for producing control signals for application to the actuator means.

3. A process control valve as in claim 2 wherein said utilization means comprises a processing means which includes means for storing a predetermined temperature value, means for comparing the signal representing the temperature $T_1$ of the fluid with the stored temperature value and for producing a difference signal whose magnitude represents the difference between the compared values, means for producing control signals for application to the actuator means to cause it to move the throttling element to thereby vary the temperature of fluid flowing in the passage to more closely match the stored temperature value and reduce the magnitude of the difference signal.

4. A process control valve as in claim 1 further comprising a cavitation sensor disposed downstream of the throttling element in the valve body for producing a fourth signal representing the cavitation of the fluid occurring in the fluid flow passage.

5. A process control valve as in claim 1 further comprising a temperature sensor for producing a third signal representing the temperature $T_1$ of the fluid in the fluid flow passage, and a throttling element position sensor for producing a fourth signal representing the flow capacity $C_v$ of the valve body, and wherein said utilization means further comprises processing means for determining from the first, second and fourth signals the flow rate of the fluid in the passage.

6. A process control valve as in claim 5 wherein said fluid is a liquid having a specific gravity of $G_F$, and wherein said processing means comprises stored program control means for determining the flow rate Q in accordance with $$Q = k\, C_v \sqrt{\frac{P_1 - P_2}{G_f}}$$

where k is a scaling constant determined for the valve body, and $C_v$ is the flow capacity of the valve body.

7. A process control valve as in claim 5 wherein said fluid is a gas having a molecular weight of M and a ratio of specific heats k, and wherein said processing means comprises a stored program control means for determining the flow rate Q in accordance with $$Q = g\, C_v\, P_1\, Y \sqrt{\frac{P_1 - P_2}{P_1 M T_1 Z}}$$

where g is a scaling constant determined for the valve body, $C_v$ is the flow capacity of the valve body, Y is an expansion factor equal to $1 - \Delta P/P_1 3 F X_T$, where $F_k = k/1.40$, $X_T$ is the terminal pressure drop for the valve body, and Z is a compressibility factor of the gas in question determined for a particular $T_1$ and $P_1$.

8. A process control valve as in claim 5 wherein said processing means includes means for storing a predetermined flow rate value, means for comparing the determined flow rate with the stored flow rate value and for producing a difference signal whose magnitude represents the difference between the compared values, and means for producing control signals for application to the actuator means to cause it to move the throttling element to thereby vary the flow rate to more closely match the stored flow rate value and reduce the magnitude of the difference signal.

9. A process control valve as in claim 1 wherein said first and second pressure sensors are disposed at a side of the inlet and a side of the outlet respectively of the valve body.

10. A process control valve as in claim 9 wherein said valve body defines a fluid passage having a generally linear axis at the inlet, a generally linear axis at the outlet, and a curved axis between the inlet and outlet, and wherein the first and second pressure sensors are disposed in the linear portion of the passage at the inlet thereof and linear portion of the passage at the outlet thereof respectively.

11. A process control valve comprising a fluid valve body having an inlet for receiving fluid, an outlet for discharging fluid, a fluid flow passage connecting the inlet and outlet, and a controllable throttling element which is moveable to selectively vary the cross-sectional area of flow of at least a portion of the passage, actuator means coupled to the valve body and responsive to control signals for selectively moving the throttling element, at least one sensor disposed in the valve body for producing at least one characterizing signal representing at least one physical parameter of the valve body and/or fluid present in the valve body, and utilization means for receiving said characterizing signals and for developing an output dependent upon the received characterizing signals, wherein said utilization means is disposed on the valve and comprises stored program control means for receiving said characterizing signals and for producing control signals for application to the actuator means to cause it to move the throttling element in a manner dependent upon the values of the characterizing signals.

12. A process control valve as in claim 11 wherein said utilization means further comprises means for producing a visual display of the characterizing signals.

13. A process control valve as in claim 12 wherein said sensors further comprise position sensing means for producing a position signal representing the position of the throttling element in the valve body, and control signal measuring means for producing a status signal representing the magnitude of the control signal delivered to the actuator means, and wherein said visual display producing means comprises
a display screen, and
means for producing the selective display on the display screen visual signatures representing each of the first signal, second signal, position signal and status signal.

14. In combination with a flow control valve having a valve body with an inlet, outlet and valve passage for carrying fluid from the inlet to the outlet, a valve plug moveable to selectively vary the size of the valve passage through which fluid flows to thereby vary the rate of fluid flow through the valve, a valve actuator responsive to pneumatic control signals for developing a pressure to selectively move the valve plug, and a valve positioner responsive to command signals for producing pneumatic control signals from an air supply source for application to the valve actuator, a valve diagnostic system comprising
means for producing signals indicating the position of the valve plug,
first means disposed in the valve body for producing signals indicating the pressure of fluid at the valve body inlet,
second means disposed in the valve body for producing signals indicating the pressure of fluid at the valve body outlet,
means for storing said position signals and inlet and outlet pressure signals, and
means for displaying representations of the inlet and outlet pressure signals for selected positions of the valve plug.

15. A system as in claim 14 wherein said first means is disposed in a side wall of the valve body at the inlet thereof, and wherein said second means is disposed in a side wall of the valve body at the outlet thereof.

16. A system as in claim 14 further including means disposed in a wall of the valve body adjacent the valve passage for producing signals indicating the temperature of fluid in the passage, wherein said storing means further includes means for storing said temperature indicating signals, and
wherein said displaying means further includes means for displaying representations of the temperature indicating signals for selected positions of the valve plug.

17. A system as in claim 16 further including processing means responsive to said inlet and outlet pressure signals and said position signals for calculating the flow rates of fluid through the valve body, wherein said storing means further includes means for storing flow rate calculations, and wherein said displaying means further includes means for displaying representations of the flow rate calculations for selected positions of the valve plug.

18. A system as in claim 14 further including
means for producing signals $P_a$ indicating the pressure in the valve actuator,
means for producing signals $P_s$ indicating the pressure of the air supply source,
means for producing signals $p_c$ indicating the pressure of the pneumatic control signals,
means for producing signals p indicating the position of the valve plug,
wherein said storing means includes means for storing said signals $P_a$, $P_s$, $P_c$ and p, and
wherein said displaying means includes means for displaying representations of the signals $P_a$, $P_s$ and $P_c$ for selected positions of the valve plug.

19. A system as in claim 18 further including
signal generation means for producing command signals to define positions to which the valve plug is to be moved,
wherein said sensor means further include means for producing signals Ic indicating the value of the command signals,
wherein said storing means further includes means for storing said signals Ic, and
wherein said displaying means further includes means for displaying representations of the signals Ic for selected positions of the valve plug.

20. A system as in claim 19 further including input means for supplying input signals to the signal generation means to cause the signal generation means to produce command signals which define positions to which the valve plug is to be moved.

21. A system as in claim 18
wherein said valve actuator comprises a double-action piston actuator having a housing, a piston moveable up and down in the housing and coupled to the valve plug to move the valve plug, upper inlet means for receiving upper pneumatic control signals to develop an upper pressure to cause the piston to move downwardly, and a lower inlet means for receiving lower pneumatic control signals to develop a lower pressure to cause the piston to move upwardly,
wherein said valve positioner comprises means responsive to said command signals for selectively supplying upper pneumatic control signals to the upper inlet means of the actuator and lower pneumatic control signals to the lower inlet means to thereby control the position of the valve plug, and wherein said $P_d$ signal producing means comprises means for producing signals $P_u$ indicating the magnitude of the upper pressure, and signals $P_d$ indicating the magnitude of the lower pressure.

22. A method for diagnostic testing of a fluid control valve through which fluid flows and which is operated by an actuator in response to actuation signals, said method comprising
 (a) applying predetermined actuation signals to the actuator of said valve,
 (b) detecting and storing a first set of valve parameter values which are developed in said valve as the valve is operated in response to the predetermined actuation signals,
 (c) detecting and storing subsequent sets of valve parameter values developed at selected times upon subsequent operation of the valve, and
 (d) displaying said first set valve parameter values and selected ones of said subsequent sets of valve parameter values.

23. A method in accordance with claim 22 wherein said detecting steps comprise detecting valve parameter values by sensing means mounted on said valve and adapted to produce signals indicative of the values of said valve parameters.

24. A method in accordance with claim 23 wherein the detected valve parameter values are digitized and stored in an electronic memory mounted on the valve.

25. A method in accordance with claim 24 further comprising
 (e) supplying valve operation input signals to a microprocessor mounted on the valve to identify a desired operation of the valve, and
 (f) the microprocessor supplying actuation signals to the actuator to cause the actuator to operate the valve as specified by said input signals.

26. A method in accordance with claim 25 wherein said detecting steps comprise detecting the valve parameter values of pressures at an inlet of the valve and an outlet of the valve, said method further including the steps of
 (g) the microprocessor calculating the flow rate of fluid through the valve from the valve inlet and outlet pressures detected, and
 (h) displaying representations of calculated flow rates for different operations of the valve.

27. A method in accordance with claim 22 wherein the fluid control valve includes a throttling element moveable by the actuator to selected positions, in response to command signals, to thereby control the flow rate of fluid through the valve, and wherein the actuation signals include command signals defining positions to which the throttling element is to be moved, said method further comprising
 (i) applying command signals to the actuator to cause the actuator to move the throttling element to the positions defined by the command signals,
 (j) periodically sensing the actual positions of the throttling element, and
 (k) developing an indication of the difference, if any, of the actual positions sensed and the corresponding positions defined by the command signals which caused the actuator to move the throttling element to such actual positions.

28. In combination in a fluid control valve which is operated by an actuator in response to actuation signals, tester apparatus for testing and analyzing the valve comprising
 means for sending controlled actuation signals to the actuator to cause the actuator to operate the valve,
 sensor means disposed in the valve for measuring of specific valve parameters upon operation of the valve,
 means for storing the measured valve parameters, and
 means for displaying the stored valve parameters.

29. Tester apparatus in accordance with claim 28 wherein said sensor means includes means for producing data signals indicative of said specific valve parameters for storing in said storing means.

30. Tester apparatus in accordance with claim 29 further comprising
 means for storing predetermined data representing valve parameters which would result from proper operation of the valve,
 means for comparing the predetermined data with the data signals,
 means for producing a representation of the results of comparing the predetermined data with the data signals for displaying on the displaying means, and
 means for producing an alarm signal when the data signals fail to match the predetermined data within a certain selected range.

31. A method of controlling the operation of a flow control valve having a valve body with an inlet, outlet and passageway therebetween for carrying fluid, a valve throttling means disposed in the passageway and being selectively moveable to various positions to vary the flow volume of fluid through the valve body, an actuator responsive to command signals for moving the throttling means in accordance with the command signals, sensor means disposed in the valve body for measuring fluid pressure $P_i$ at the inlet, fluid pressure $P_o$ at the outlet, and temperature T of the fluid in the passageway, position sensing means for measuring the percentage p at which the throttling means is open, ranging from 0 to 100 percent, and microprocessor means for receiving and storing the measurements $P_i$, $P_o$ and T and p and for producing command signals to control the operation of the valve, said method comprising
 (a) measuring $P_i$, $P_o$ and T for a selected value of p and storing said measurements and the value of p for which the measurements
 (b) calculating the fluid flow rate $Q_c$ through the valve for the selected value of p using the stored measurements, and storing the calculated $Q_c$,
 (c) storing a predetermined flow rate value $Q_s$,
 (d) comparing $Q_c$ with $Q_s$ and supplying command signals to the actuator to further open the throttling means by a predetermined percentage if $Q_c$ is less than $Q_s$, and to further close throttling means by a predetermined percentage if $Q_c$ is greater than $Q_s$.

32. A method as in claim 31 further comprising
 (e) displaying on a video display screen representations of the stored $Q_c$ and $Q_s$.

33. A method as in claim 31 or 32 wherein the fluid is a liquid and wherein step (b) comprises
 (f) calculating the pressure drop from the inlet to the outlet $\Delta P_v = P_i - P_o$ for the selected value of p and storing the results of the calculation,
 (g) calculating $\Delta P(isa) = a + b\ \Delta P_v$ and storing the results of the calculation, where $\Delta P(isa)$ is the pressure drop from the inlet to the outlet calibrated to ISA standards, and a and b are empirically determined constants for the selected value of p, (h) calculating the vapor pressure of the fluid $$P_v = \exp\left[A - \frac{B}{T+C}\right]$$

for the selected value of p and storing the results of the calculations, where A, B and C are Antoines coefficients for the liquid, (i) calculating the liquid pressure ratio factor $$F_f = 0.96 - 0.28\sqrt{\frac{P_v}{P_c}}$$

and storing the results of the calculation, where $P_c$ is a constant for the particular liquid flowing through the valve, (j) determining the flow coefficient $C_v$ and liquid pressure recovery coefficient $F_L$ for the valve from a predetermined and stored table, for the selected value of p, (k) calculating $\Delta P\text{(choked)} = F_L^2 (P_i - F_f P_v)$ and storing the results of the calculation, (l) calculating the specific gravity of the liquid $$G_f = GFB \frac{2T_c - T}{2T_c - T_B}$$

and storing the results of the calculation, where GFB, $T_c$ and $T_B$ are known constants for the particular liquid flowing through the valve, (m) comparing $\Delta P\text{(isa)}$ with $\Delta P\text{(choked)}$ and proceeding with step (n) if $\Delta P\text{(isa)}$ is less than $\Delta P\text{(choked)}$, and with step (o) if $\Delta P\text{(isa)}$ is greater than $\Delta P\text{(choked)}$, (n) calculating $$Q_c = C_v \sqrt{\frac{\Delta P_{(isa)}}{G_f}}$$

and storing the results of the calculation, or (o) calculating $$Q_c = C_v \sqrt{\frac{\Delta P \text{(Choked)}}{G_f}}$$

and storing the results of the calculation.

34. A method as in claim 31 or 32 wherein the fluid is a gas and wherein step (b) comprises (f) calculating the vapor pressure of the gas $$P_v \exp\left[A - \frac{B}{T+C}\right]$$

for the selected value p and storing the results of the calculation, where A, B and C are Antoines coefficients for the gas, and storing the results of the calculation, (g) comparing T with $T_c$, where $T_c$ is the critical absolute temperature for the particular gas flowing through the valve, and moving to step (h) if T is less than $T_c$, otherwise moving to step (i), (h) comparing $P_v$ with $P_i$ and terminating if $P_v$ is less than Pi, otherwise moving to step (i), (i) determining $P_{i(isa)}$ and $P_{o(isa)}$ representing the fluid pressure at the inlet and outlet of the valve body respectively calibrated to ISA standards, and storing the results of the determination, (j) calculating $$P_r = \frac{P_{i(isa)}}{P_c} \text{ and } T_r = T/T_c,$$

where $P_c$ is the critical pressure, psia, for the gas, and then determining the compressibility factor Z of the gas from predetermined and stored tables using $P_r$ and $T_r$, and storing the results of the determination, (k) determining the flow coefficient $C_v$ and gas pressure recovery coefficient $X_t$ for the valve from a predetermined and stored table, for the selected value of p, (l) calculating $$X = \frac{P_{i(isa)} - P_{o(isa)}}{P_{i(isa)}}$$

and storing the results of the calculation, (m) calculating $$Y = 1 - \frac{X}{3F_k X_t}$$

where $F_k = K/1.40$ and K is the ratio of specific heats for the gas in question, and storing the results of the calculation, and (n) calculating $$q = 7320 \, C_v \, P_{i(isa)} \, Y \sqrt{\frac{X}{MTZ}}$$

where M is the molecular weight of the gas, and storing the results of the calculation.

35. In a fluid system having a fluid source and a fluid sink, flow control valve apparatus comprising a valve body coupled between the fluid source and fluid sink for carrying fluid therethrough, having a control element which is moveable to vary the flow rate of the fluid through the valve body, actuator means coupled to the valve body and responsive to control signals for selectively moving the control element, at least one sensor disposed in the valve body for developing first signals representing at least one parameter of the fluid in the valve body, at least one sensor disposed in the fluid system outside the valve body for developing second signals representing at least one parameter of the fluid outside the valve bodies, and processing means for receiving said first and second signals and for producing an output action in response thereto.

36. Apparatus as in claim 35 wherein said processing means is disposed on said valve body.

37. Apparatus as in claim 35 wherein said processing means includes visual display means for displaying representations of the first and second signals.

38. Apparatus as in claim 35 wherein said processing means includes means for producing control signals for application to the actuator means to cause it to move the control element in accordance with the first and second signals.

* * * * *

UNITED STATES PATENT AND TRADEMARK OFFICE
CERTIFICATE OF CORRECTION

PATENT NO. : 5,251,148
DATED : 10/05/93
INVENTOR(S) : Haines, Messano, Beatty, Gooch, Glenn & O'Hara It is certified that error appears in the above-indentified patent and that said Letters Patent is hereby corrected as shown below:

In FIG. 5, cell no. 344, a radical should be added to the equation to read as follows:

$$\text{CALCULATE } q = Cv \sqrt{\frac{\Delta P(isa)}{Gf}}$$

In FIG. 5, cell no. 340, a radical should be added to the equation to read as follows:

$$\text{CALCULATE } q = Cv \sqrt{\frac{\Delta P(CHOCKED)}{Gf}}$$

Signed and Sealed this

First Day of November, 1994

Attest:

BRUCE LEHMAN

*Attesting Officer*  *Commissioner of Patents and Trademarks*